W. R. VANDEWERKER.
SOAP HOLDER.
APPLICATION FILED FEB. 5, 1907.

914,619.

Patented Mar. 9, 1909.

WITNESSES:

Warren R. Vandewerker, INVENTOR

By C. A. Snow & Co.

ATTORNEYS

THE NORRIS PETERS CO., WASHINGTON, D. C.

UNITED STATES PATENT OFFICE.

WARREN R. VANDEWERKER, OF CLARK, SOUTH DAKOTA.

SOAP-HOLDER.

No. 914,619.    Specification of Letters Patent.    Patented March 9, 1909.

Application filed February 5, 1907. Serial No. 355,909.

*To all whom it may concern:*

Be it known that I, WARREN R. VANDEWERKER, a citizen of the United States, residing at Clark, in the county of Clark and State of South Dakota, have invented a new and useful Soap-Holder, of which the following is a specification.

This invention relates to soap cakes or tablets and more particularly to means for supporting the soap in elevated position when not in use so as to keep the latter dry and clean and prevent wasting the same.

The object of the invention is to provide a cake of soap having a suspension device inserted therein and extended beyond one edge of the cake to form a loop or eye by means of which the soap may be conveniently suspended from a nail or other suitable support after each washing operation.

A further object is to provide the suspension device or loop with terminal anchoring members or hooks having their shanks bent inwardly to form angular projections which grip the soap and thereby assist in preventing accidental displacement of the suspension device.

A still further object of the invention is generally to improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claim.

Figure 1:
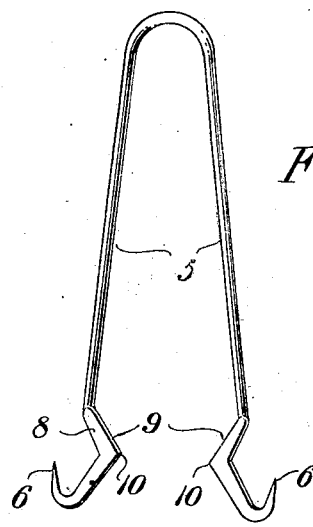
Figure 2:
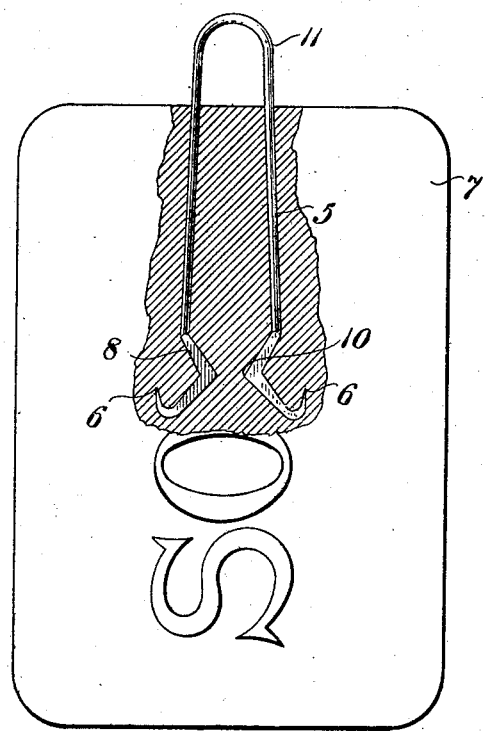

In the accompanying drawings forming a part of this specification: Figure 1 is a perspective view of a suspension device constructed in accordance with my invention. Fig. 2 is a side elevation partly in section of the suspension device embedded in a cake of soap.

Similar numerals of reference indicate corresponding parts in both figures of the drawings.

The improved suspension means may be used in connection with laundry, toilet or scouring soap and may be either embedded in the soap during the manufacture of the same or subsequently placed in position.

The device consists of a suspension loop preferably formed of a single piece of wire or other suitable material bent to form a pair of spaced converging arms 5 the ends of which are bent to form terminal anchoring members or hooks 6 adapted to be embedded in a cake of soap, indicated at 7.

The shanks 8 of the hooks are preferably flattened to form broad bearing surfaces and are extended inwardly to produce oppositely disposed angular projections 9, the apex 10 of one projection being disposed in alinement with the apex of the opposite projection thereby to firmly grip the soap and effectually prevent accidental displacement or withdrawal of the suspension device.

The closed end of the loop is extended beyond the adjacent end of the soap 7 to form an eye 11 by means of which the cake of soap may be conveniently suspended from a nail or similar support so as to keep the soap dry and clean and prevent wasting the same. If desired, however, a cord, chain or other flexible medium may be attached to the eye 11 and said cord secured to the nail or support so as to prevent an unauthorized person from surreptitiously removing the same.

The suspension loop is preferably molded or otherwise positioned in the soap during the manufacture of the latter but if desired may be inserted in the soap after the same has been molded into cakes by pressing inwardly on the spring arms 5 until the apex of the projections 9 are disposed in contact with each other and subsequently forcing the loop longitudinally of the soap through one end of the latter, the flat bearing surfaces 8 serving as cutting edges when positioning the loop in the soap in this manner. When the loop is placed in position after the manufacture of the soap the spring pressed arms 5 will expand and thus bite into the soap so as to lock the same in position.

Attention is called to the fact that the hooks 6 engage the soap on each side of the arms 5 while the angular projections 9 extend between the arms 5 and engage the soap between said arms so as to form in effect a double anchorage for the suspension device. When the soap becomes worn or reduced in size from constant use the suspension loop may be detached from the soap and inserted in a new cake of soap by pressing the spring arms 5 together and forcing the suspension loop into one end or edge of the soap in the manner described.

The suspension loops may be made in different sizes and shapes and nickled, japanned or otherwise coated to give the same a neat attractive appearance.

From the foregoing description it will be seen that there is provided an extremely simple, inexpensive and efficient device admirably adapted for the attainment of the ends in view.

Having thus described the invention what is claimed is:

As a new article of manufacture, a suspension loop for soap formed of a single piece of wire bent upon itself to form converging spring arms, the free ends of which are bent outwardly to produce terminal anchoring hooks having their bills projected laterally beyond the longitudinal plane of the arms and extended in the direction of the closed end of the loop, the shanks of said hooks being flattened in the same plane and extended inwardly between the arms of the loop to form substantially V shaped projections the apexes of which are disposed in horizontal alinement with each other and arranged above the terminals of the bills of the hooks.

In testimony that I claim the foregoing as my own, I have hereto affixed my signature in the presence of two witnesses.

WARREN R. VANDEWERKER.

Witnesses:
OTTO BAARSCH,
W. J. RAPELJE.